US 7,983,701 B2

(12) United States Patent
Bell et al.

(10) Patent No.: US 7,983,701 B2
(45) Date of Patent: Jul. 19, 2011

(54) ALERTS BASED ON SIGNIFICANCE OF FREE FORMAT TEXT MESSAGES

(75) Inventors: David Rowland Bell, Hampshire (GB); John Brian Pickering, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 11/933,460

(22) Filed: Nov. 1, 2007

(65) Prior Publication Data

US 2009/0117922 A1    May 7, 2009

(51) Int. Cl.
*H04W 4/00* (2009.01)
(52) U.S. Cl. ............... 455/466; 455/403; 455/422.1; 455/414.1; 455/566; 455/567
(58) Field of Classification Search .......... 455/466, 455/403, 422.1, 566, 567, 414.1; 370/328, 370/338, 349, 522, 496; 709/204–207
See application file for complete search history.

(56) References Cited

U.S. PATENT DOCUMENTS

2005/0261032 A1* 11/2005 Seo et al. ............... 455/566
2009/0295565 A1* 12/2009 Oh et al. ............. 340/539.11
2010/0179991 A1* 7/2010 Lorch et al. ............ 709/206

* cited by examiner

*Primary Examiner* — Huy Phan
*Assistant Examiner* — Chuong A Ngo
(74) *Attorney, Agent, or Firm* — Schmeiser, Olsen & Watts; Rob Straight

(57) ABSTRACT

A method and system for processing a free format short message service (SMS) text message for alerting a mobile phone's user to significant information in the message received by the mobile phone from a sender. Program code stored in memory on the mobile phone executes the method on a processor. A theme, a rheme, at least one structural component, and a sentence type of the normalized message are generated from which a FEATURE FACTOR priority is determined. Semantic content of the normalized message is determined from which an EMOTIONAL FACTOR priority is determined. A TOTAL PRIORITY computed as a sum of the FEATURE FACTOR priority and the EMOTIONAL FACTOR priority is determined to exceed a predetermined threshold, from which it is determined that the received message is significant, which triggers overriding default handset settings of the mobile phone and alerting the user that the received message is significant.

1 Claim, 4 Drawing Sheets

ALERTS BASED ON SIGNIFICANCE OF FREE FORMAT TEXT MESSAGES

FIELD OF THE INVENTION

This invention relates to the processing of free format short message service (SMS) text messages for alerting a user of a mobile phone to significant information being received by the mobile phone.

BACKGROUND OF THE INVENTION

The arrival of an incoming short message service (SMS) messages to a mobile phone can be signaled to the user by playing an alert, such as a tone or tone sequence, vibrating the handset, and so forth. The settings for these alerts may be typically controlled by the central service provider or the user. Unfortunately, these alerts may not distinguish different incoming SMS messages in terms of their relative importance to the user.

Thus, there is a need for a method and system that distinguishes different incoming SMS messages in terms of their relative importance to the user.

SUMMARY OF THE INVENTION

The present invention provides a method for processing a free format short message service (SMS) text message for alerting a user of a mobile phone to significant information in the free format SMS text message being received by the mobile phone, said method performed by executing program code on a processor in the mobile phone, said program code being stored in memory on the mobile phone, said method comprising:

receiving, by the mobile phone from a sender, the free format SMS text message;

normalizing the received message by replacing special character strings in the received message by corresponding phonetically equivalent character strings to generate a normalized message;

determining a theme, a rheme, at least one structural component, and a sentence type of the normalized message wherein the at least one structural component comprises at least one characteristic selected from the group consisting of a sentence subject, a verb complement, a time reference, an anaphoric reference, and combinations thereof;

determining a FEATURE FACTOR priority for the normalized message, based on the determined theme, rheme, at least one structural component, and sentence type;

determining semantic content of the normalized message;

determining an EMOTIONAL FACTOR priority for the normalized message, based on the determined semantic content;

computing a TOTAL PRIORITY as a sum of the FEATURE FACTOR priority and the EMOTIONAL FACTOR priority;

determining that the received message is significant by determining that computed total priority exceeds a predetermined threshold; and responsive to said determining that the received message is significant, alerting the user by an audio tone or vibration that the received message is significant.

The present invention provides a method for processing a free format short message service (SMS) text message for alerting a user of a mobile phone to significant information in the free format SMS text message being received by the mobile phone, said method performed by executing program code on a processor in the mobile phone, said program code being stored in memory on the mobile phone, said method comprising:

receiving, by the mobile phone from a sender, the free format SMS text message;

normalizing the received message by replacing special character strings in the received message by corresponding phonetically equivalent character strings to generate a normalized message, wherein said normalizing comprises performing a lookup and substitution process in which a direct substitution is made of the special character strings in the received message by rewrite strings stored in a lexicon or said normalizing comprises rewriting the special character strings in the received message according to pronunciation rules;

determining a theme, a rheme, at least one structural component, and a sentence type of the normalized message, wherein the at least one structural component consists of a sentence subject, a verb complement, a time reference, and an anaphoric reference, and wherein the sentence type indicates whether the normalized message is a declarative statement, a yes/no question, a wh-question, or a command;

determining a plurality of features of the normalized message with respect to the determined theme, rheme, at least one structural component, and sentence type, wherein said determining the plurality of features comprises providing a list of features and selecting the plurality of features from the list of features, wherein the list of features comprises a feature of the theme and the sentence subject coinciding, a feature of the theme and the sentence subject not coinciding, a feature of a yes/no question having an auxiliary+form, a feature of a yes/no question not having said auxiliary+form, a feature of a wh-question having a wh-word+verb form, a feature of a wh-question having a determiner+noun form, and a feature of said command;

determining an individual feature priority associated with each feature of the plurality of features;

determining a FEATURE FACTOR priority as a highest individual feature priority across all features of the plurality of features;

determining semantic content of the normalized message, wherein said determining semantic content of the normalized message comprises deriving first keywords from the normalized message followed by performing a contextual search to associate the first keywords with second keywords that differ from the first keywords, wherein the first keywords include a noun, a verb, and an adjective;

determining an EMOTIONAL FACTOR priority for the normalized message, based on the determined semantic content;

ascertaining that a prior message comprising emotional content is associated with the anaphoric reference and that the prior message had been sent by a user of the mobile phone to the sender, wherein said determining the EMOTIONAL FACTOR priority comprises, in response to said ascertaining, including in the EMOTIONAL FACTOR priority an anaphoric reference priority component associated with the anaphoric reference;

computing a total priority as a sum of the FEATURE FACTOR priority and the EMOTIONAL FACTOR priority;

determining that the received message is significant by determining that computed total priority exceeds a predetermined threshold; and responsive to said determining that the received message is significant, alerting the user by an audio tone or vibration that the received message is significant.

The present invention advantageously provides a method and system that distinguishes different incoming SMS messages in terms of their relative importance to the user.

DETAILED DESCRIPTION OF THE INVENTION

The present invention relates to processing free format short message service (SMS) text signals received by a mobile phone (e.g., cellular phone, smartphone, etc.) to override handset settings and alert the user to significant information in accordance with local, user-specified profile settings. In one embodiment, an SMS message is a text message of up to 160 characters and up to 224 characters if using a 5 bit mode. The scope of the present invention includes an SMS message of up to any number of text characters in active usage in the field of SMS messaging. Note that messages over 160 text characters (or over any other maximum number of text characters) may be handled by being automatically split by a service provider that controls transmission of the SMS text message.

A free format SMS text message is defined herein as an SMS message whose form is not subject to any formatting constraint other than the total length of the SMS message not exceeding the maximum number of permissible characters (e.g., 160, 224, etc. as stated supra) in the SMS message. For example, the SMS message is not constrained as to number of fields, field length, and field format.

Figure 1:
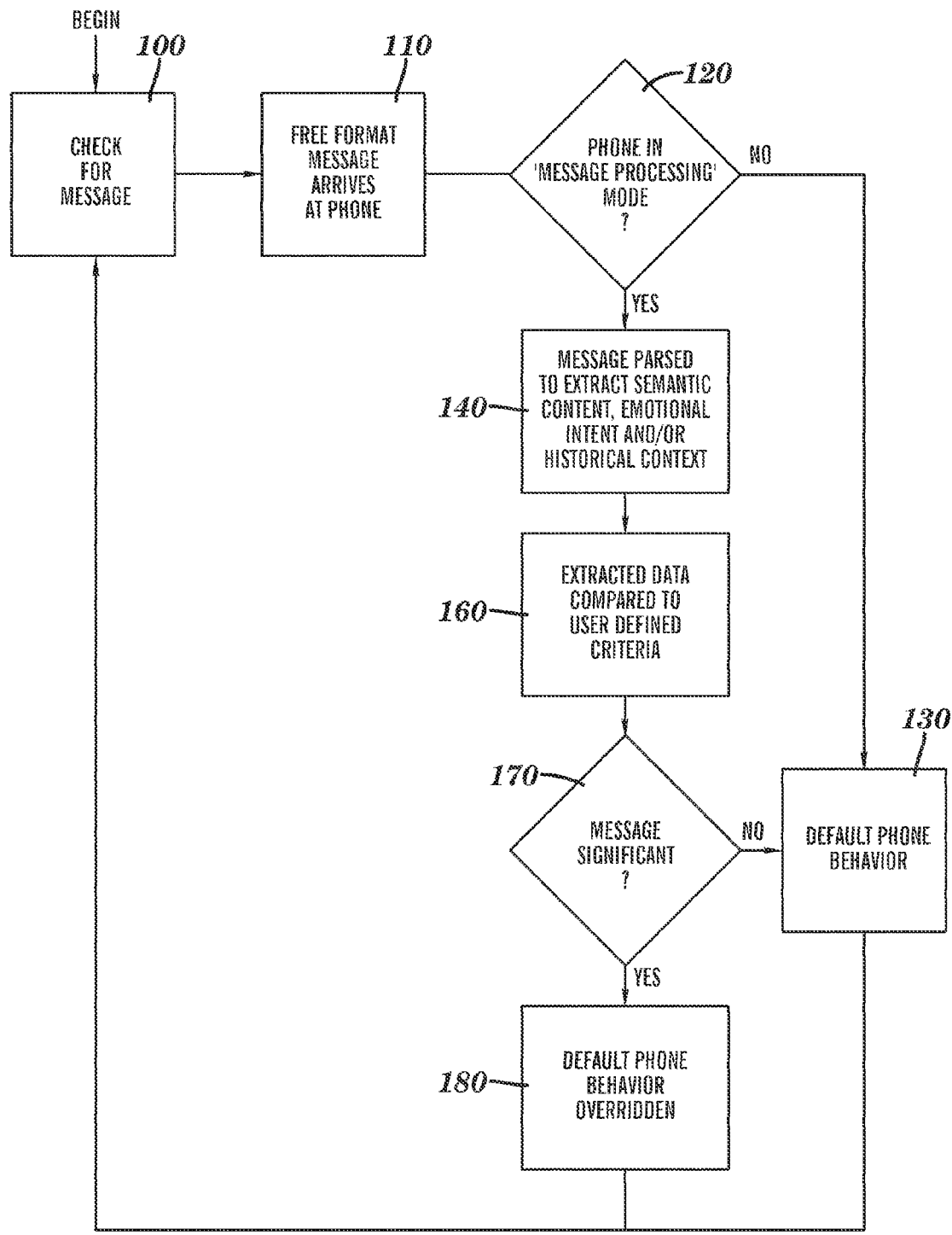
FIG. 1 is a flow chart describing a method that determines whether an incoming free-format SMS message should override the default handset settings of a mobile phone, in accordance with embodiments of the present invention.

FIG. 1 is a flow chart describing a method that determines whether an incoming free-format SMS message should override the default handset settings of a mobile phone, in accordance with embodiments of the present invention. The method steps depicted in FIG. 1 are performed by the mobile phone system 80 depicted in FIG. 5 and described infra.

The mobile phone has an 'audio' mode of operation in which the method of the present invention is not performed and the default settings of the mobile phone's handset are operative to alert the user to all incoming messages by audio means. The mobile phone also has a 'message processing' mode of operation in which the method of the present invention is performed. In the 'message processing', no tone is played and no phone vibration is activated unless the default settings of the handset are overridden due to the receipt of a significant free format SMS message by the mobile phone as determined by the method of the present invention.

Step 100 is a wait loop that checks for a free format SMS message received by the mobile phone. After a free format SMS message has been received by the mobile phone in step 110, step 120 determines whether the mobile phone is in the 'message processing' mode.

If step 120 determines that the mobile phone is not in the 'message processing' (i.e., the mobile phone is in the 'audio' mode), then the handset's default settings are operative and step 130 is performed next.

If step 120 determines that the mobile phone is in the 'message processing' mode, then step 140 parses the free format SMS message to extract data from the message and to analyze the message as to its significance. Step 140 is described infa in detail in FIG. 2.

In step 160, the content of the received message is compared with user-specified criteria to determine the significance of the message as an alternative to step 140. In one embodiment, steps 140 and 160 are applied to different aspects of the parsing and analysis of the message.

Based on the result of either step 140 or of step 160 or of both, step 170 determines whether the received free format SMS message is significant, based on using a cumulative score (i.e., a total score) matched against a threshold value (e.g., a user-configurable threshold value) to make this determination as explained infra in greater detail.

If step 170 determines that the received free format SMS message is not significant, then step 130 is executed next.

If step 170 determines that the received free format SMS message is significant, then step 180 is executed next.

Step 130 implements the default mode of operation of the handset and the method loops back to step 100 to again check for a free format SMS message received by the mobile phone.

Step 180 overrides the default handset settings of the mobile phone and alerts the user by an audio tone or vibration to indicate that the message is significant, and the method loops back to step 100 to check again for a free format SMS message received by the mobile phone.

Figure 2:
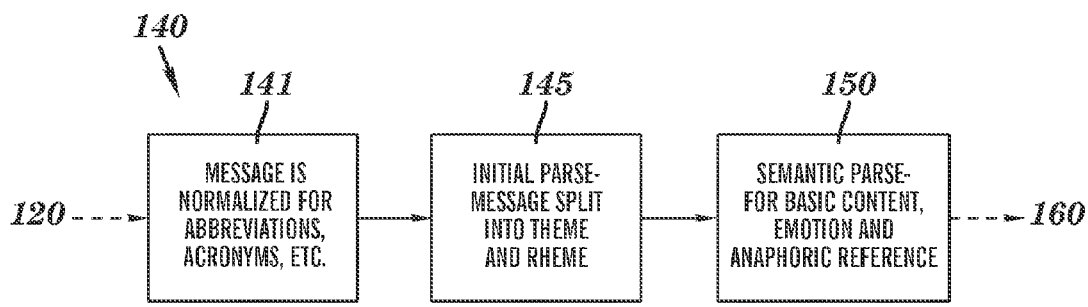
FIG. 2 is a flow chart describing an initial normalization step and a message parsing step of FIG. 1, in accordance with embodiments of the present invention.

FIG. 2 is a flow chart describing the message parsing and analysis step 140 of FIG. 1, in accordance with embodiments of the present invention. The following description of the message parsing and analysis step 140 is a complete description that enables step 140 to be performed instead of step 160 in FIG. 1.

Step 141 pre-processes the message 141 to remove textual anomalies, such as abbreviations such as b4 for before, and l8er for later.

Step 145 performs an initial parsing of the message by processing the message in a structural analysis phase in which types of sentences in the message are identified along with some measure of their complexity.

Step 150 extracts the meaning, in light of the context (i.e., the "subject" or "topic") of the message, of any reference to other related messages and any specific emotional intent which may be inferred from the text or associated emoticons. An emoticon is a group of text characters suggesting an emotion.

Figure 3:
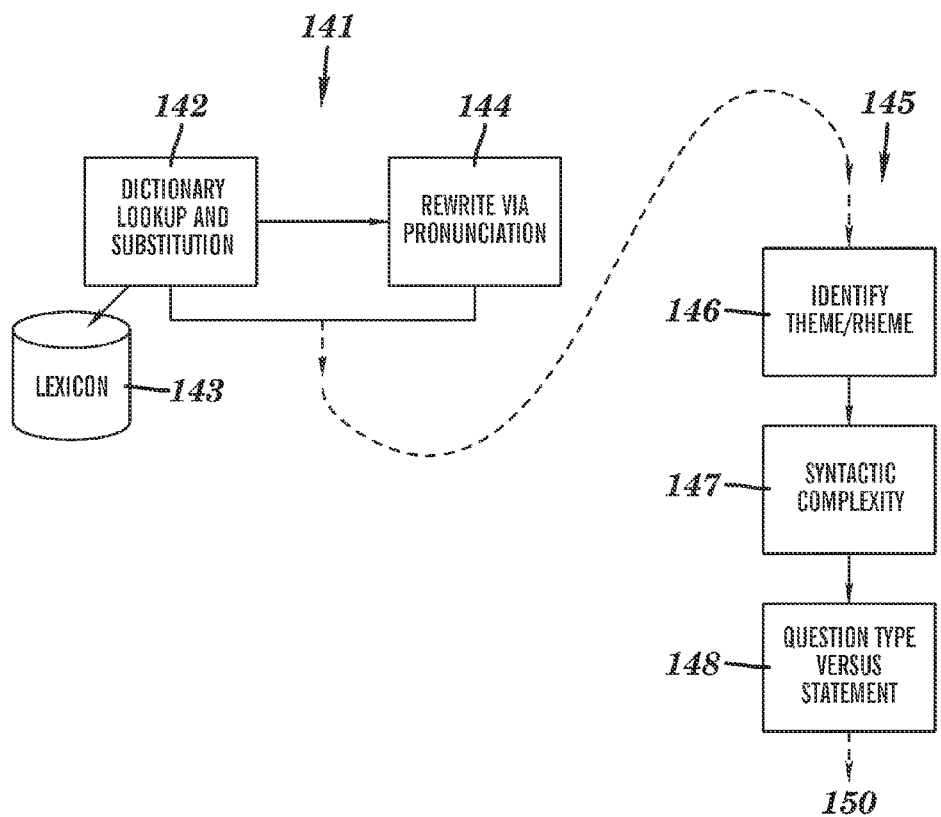
FIG. 3 is a flow chart describing in detail the initial normalization step and the message parsing step of FIG. 2, in accordance with embodiments of the present invention.

FIG. 3 is a flow chart describing in detail the message normalization step 141 and the initial parsing step 145 of FIG. 2, in accordance with embodiments of the present invention.

The following three exemplary messages illustrate the phases associated with the initial parsing of the content of the message.

(1) "Train 18. Cu@9"
(2) "That wasn't nice!:-("
(3) "B4 u go, ring home!"

In FIG. 3, the message normalization step 141 normalizes the message by replacing character strings in the message by corresponding phonetically equivalent character strings to generate a normalized message. Step 141, which comprises a lookup and substitution step 142 and/or a rewrite process step 144, interprets special characters which may have some significance in terms of message urgency, but which would not normally be able to be interpreted by the linguistic processing phases.

Normalizing strings such as l8, cu, @, b4, u and the emoticon :-(, which represents ☺,can be done according to the lookup and substitution step 142 and/or the rewrite process step 144.

In the lookup and substitution step 142, a direct substitution is be made of the incoming text against a set of rewrite strings stored in a lexicon 143 as illustrated in Table 1.

TABLE 1

| Rewrite Strings. | |
|---|---|
| Input | Substitution |
| l8 | late |
| l8r | later |
| Cu | see you |
| @ | at |
| :-( | <sad> |
| ... | ... |

In the case of the ☺,emoticon, the substitution is marked with the angled brackets "< . . . >" as a control command, as would be the case for other emoticons: ;-), :-), :) and so forth.

When updates (e.g., new terms coined) are made, the service provider could download the updates automatically to the database as required.

The rewrite process step 144 rewrites the text according to pronunciation rules, such as used in text-to-speech systems, that would recognise the string <character><digit> in l8 as anomalous and substitute AY T for the digit 8 to produce L AY T ("late") for l8. This is effectively a two-step spellmode operation: <character><digit> would not be recognised as a normal English word, and by default could be "spelled out" to "ell"+"eight" at the first step. Pronunciation rules are then applied a second time specifying that the letter "l" can be pronounced in the same syllable before the sound sequence AY T. In consequence, there is no need to assume a pronunciation "ell"+"eight", but rather "l" followed by "eight", or L AY T. As shown in FIG. 3, not only would this pronunciation rewrite process step 144 be used in its own right to normalize the incoming text, but also as a catch-all for the dictionary lookup and substitution phase 142.

After performing step 142 and/or step 144, the exemplary messages supra become:

(1) "Train late. See you at nine" (for "Train l8. Cu @ 9")
(2) "That wasn't nice!<sad>" (for "That wasn't nice!:-(")
(3) "Before you go, ring home!" (for "B4 u go, ring home!")

In FIG. 3, the initial parsing step 145 comprises steps 146-148.

Step 146 parses and analyzes the incoming text sentences to determine theme and rheme. The "theme" (or "topic") is the main focus of the sentence: what the sentence is about. The "rheme" (or "comment") provides information about the theme. The sentence The parcel arrived yesterday may be analysed thus into The parcel as theme (what the sentence is about); and arrived yesterday, which indicates something more about the parcel, is the rheme. In some but not all languages, the theme is the first element in the sentence, with the rheme following. As such, the theme will not necessarily coincide with the grammatical subject of the sentence. For example, The boy came home after he'd finished school may be compared with After he'd finished school, the boy came home. In the former case, the theme the boy is also the subject of the sentence. In the latter case, the theme is After school, but the boy is still the subject of the sentence. The motivation for this analysis is that it provides useful indicators (such as word order changes, focus changes, etc.) which helps to determine the importance of the message. The exemplary messages supra become:

(1) "THEME{Train} RHEME{late}. THEME{See you} RHEME{at nine}"
(2) "THEME{That} RHEME{wasn't nice!}<sad>"
(3) "THEME{Before you go,} RHEME{ring home!}"

After having established in step 146 what the sentences are about (the theme) and what are comments on the themes (the rheme), a syntactic parse step 147 identifies the main structural components of the text in the message. Step 147 involves much ellipsis, since SMS-type language is characterized among other features by short sentences often with verbs missing and sometimes with pronouns missing. The exemplary messages supra become:

(1) SUBJECT(Train) COMPLEMENT(late). VERB_PHRASE(See you) TIME(at nine).
(2) SUBJECT{ANAPHORIC REF (That)} COMPLEMENT(wasn't nice)<sad>.
(3) TIME(Before) ANTECEDENT VERB_PHRASE(you go) COMMAND(ring) TARGET_OBJECT(home).

Note that step 147 comprises a high level parse that may identify: sentence subject, verb complement, time references, and/or anaphoric references. An anaphoric reference is something within the current sentence that refers to some other object or event not present in the message.

Steps 146-147 are used to answer questions such as, inter alia, the following:

A first such question is: Do subject and theme coincide? If not, as in exemplary message (3) supra, this raises the importance to be attached to the message.

A second such question is: Are there any anaphoric references? If so, then these relate to other text messages or separate conversations. This would tend to raise the importance of the content in signalling that the message is a continuation of some other communication.

A third such question is: Are there any direct commands or instructions? If so, this would also tend to raise importance, based on the fact that the message sender wants something or wants something to happen.

Step 148 determines a sentence type for a sentence within the message, indicating whether the sentence or message is a declarative statement, a yes/no question, a wh-question, or a command (imperative). A wh-question is a question beginning with a word whose first two letters are usually "wh" (e.g., where, when, why, which, etc.; note that "how" is used in a wh-question as well). The sentence type provides information for establishing whether a response is expected (i.e., following a question) or some other action (following a command), or whether the text is simply a statement, which would only be significant if structurally different (i.e., theme and subject do not coincide) or referring to some other event or message (i.e., containing an anaphoric reference).

Thus, steps 146-148 identify the structure and type of information contained within the free format message. At this stage, it is possible to assign some form of inferred significance by considering any departure from a normal declarative sentence. In establishing significance or priority at this stage, a first pass is provided to be validated and complemented via semantic analysis in step 150 (see FIG. 4).

Table 2 summarizes exemplary individual FEATURE PRIORITY settings for various features, with priority 1 as the lowest priority and priority 7 as the highest priority. Table 2 includes features which map to the derived priority after the structural analysis phase in step 145.

TABLE 2

INDIVIDUAL FEATURE Priorities.

| ANALYSIS STEPS | FEATURE | INDIVIDUAL FEATURE PRIORITY |
|---|---|---|
| 146, 147 | Statement where theme and subject coincide: The parcel arrives tomorrow. | 1 |
| 146, 147 | Any sentence where subject and theme do not coincide: When he arrives, Rob has the parcel. | 2 |
| 146, 148 | Yes/No questions of the form: auxiliary + "you": Are you going? | 3 |
| 146, 148 | Wh-question of the form: wh-word + verb: When do you arrive? | 4 |
| 146, 148 | Yes/No questions of any other form: Is Rob there? | 5 |
| 147, 148 | Commands: Tell Stella to wait. | 6 |
| 146, 148 | Wh-question of the form: determiner + noun: Which train are you getting? | 7 |

The list of features and associated individual feature priorities in Table 2 is not an exhaustive list, but rather illustrates how structural features based on sentence type and theme/rheme analysis combine to enable priority settings to be established. Any departure from an unmarked sentence structure reflects sender intent in the sense of urgency. Unmarked" refers to a neutral rendition; for example, He said he would be here at 3 is just a normal way of expressing the statement. By contrast, It was 3 that he said would be when he would arrive, although expressing the same idea, is less usual; this is said to be marked whereas the normal version (He said he would be here at 3) is unmarked.

From Table 2, exemplary messages 1 and 2 supra have no particular significance based on the structural analysis phases of step 145. Thus, exemplary messages 1 and 2 are assigned an individual feature priority of 1 which reflects low priority. The beginning of message 3, however, has non-matching subject and theme, suggesting an individual feature priority of 2. The sentence of message 3 also includes a command which has an individual feature priority of 6. Content is tagged at this stage with a FEATURE FACTOR priority equal to the highest individual feature priority across all features in the message. In summary, the FEATURE FACTOR priority of the exemplary messages are message 1: FEATURE FACTOR priority 1; message 2: FEATURE FACTOR priority 1; message 3: FEATURE FACTOR priority 6

Figure 4:
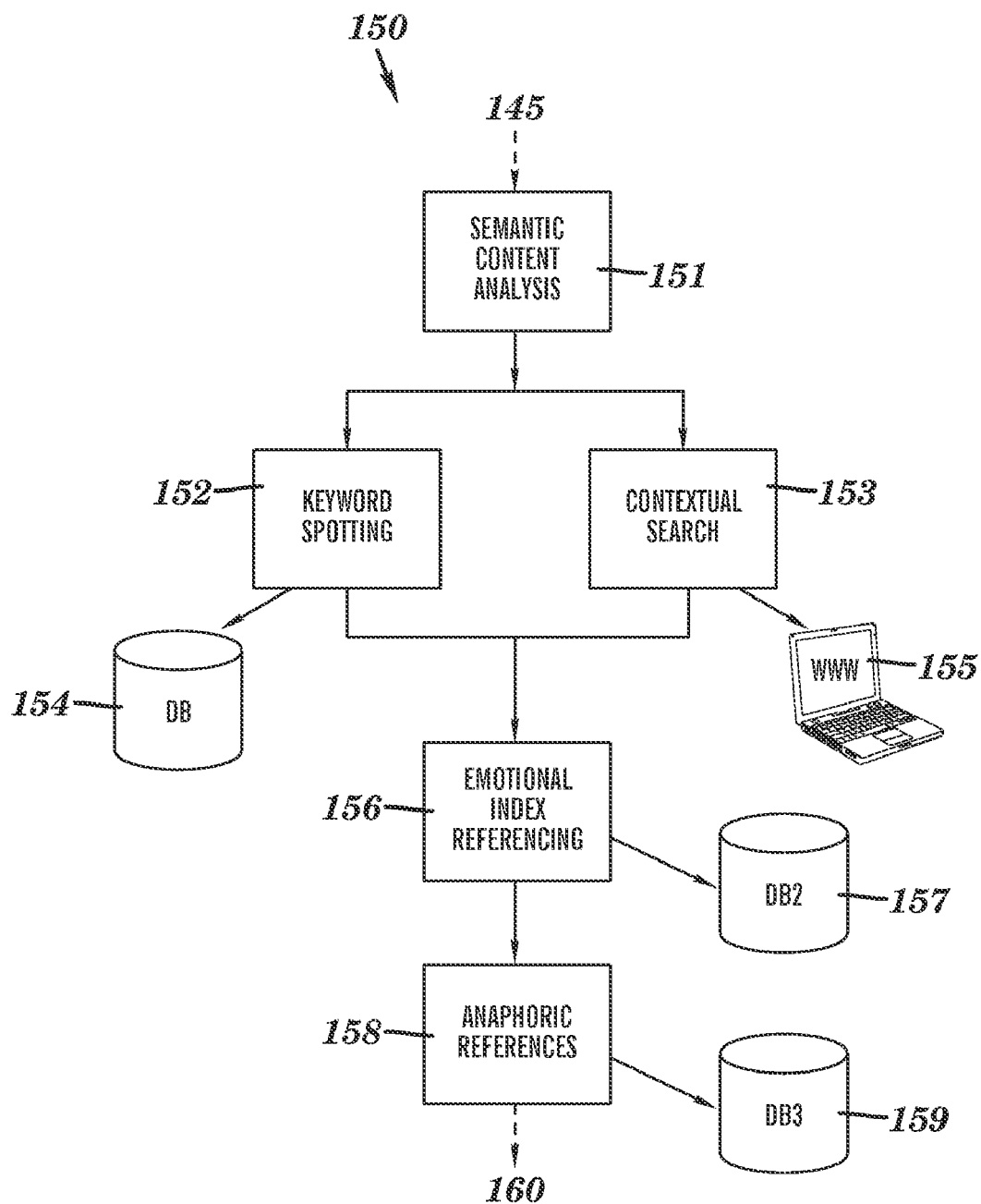
FIG. 4 is a flow chart describing a semantic parsing step of FIG. 2, in accordance with embodiments of the present invention.

FIG. 4 is a flow chart describing the semantic parsing step 150 of FIG. 2, in accordance with embodiments of the present invention. The semantic parsing step 150 attaches significance to the free format message, which is applied in conjunction with the results of structural analysis of step 145.

Step 151 processes the text content of the message for semantic content by selecting keywords in the sentences or by deriving keywords from the sentences, which is performed iteratively. First, all nouns are selected. Next, all verbs, except the verb TO BE are selected. Finally, any adverb or adjective linked to the sentence theme by the verb TO BE is selected. For the sentences of exemplary messages (1)-(3) supra, the following selections are made: NOUN: train, nine; ADJECTIVE: nice; VERB: go, ring;

These selections may be used in either or both of two ways. In the first way, these selections are used in step 152 to access pre-stored information in database 154, such as a dictionary enhanced with subject information. In the second way, a contextual search in step 153 is carried out against any suitable database 155 such as online resources or corpora. In the first way, the generalised domain would be retrieved in step 152, so that "train" would be associated with "transport and travel", for example. In the second way, a contextual search in step 153 would retrieve information more related to co-occurrence, so that "train" might result in "timetable", "schedule", "delay", "passenger", etc., taking the top few co-occurrences.

Step 156 reviews any emotional intent, using appropriate reference datasets in database 157 which is of the form <keyword>: <emotional factor priority> that maps the keywords to predetermined emotional factor priorities as illustrated in Table 3.

TABLE 3

EMOTIONAL FACTOR Datasets

| KEYWORD | EMOTIONAL FACTOR Priority |
|---|---|
| <sad> | +5 |
| danger | +10 |
| delay | +2 |
| domestic | +7 |
| ... | ... |

The KEYWORD column of Table 3 comprises descriptors such as emoticons, context and co-occurrence terms, and relationships ("domestic" referring to anything which may be considered to relate to home or family), and are retrieved directly during the semantic content analyses in steps 151, 152 and 153. The EMOTIONAL FACTOR priority column of Table 3 provides a quantitative measure of relevance (i.e., the EMOTIONAL FACTOR priority). The measures of relevance may come from a first source and/or a second source. With the first source, the measures of relevance may be derived from real world experience, such as text mining and checking text corpora, such as press and fiction. With the second source, the measures of relevance may be configured by the user. In the example sentences supra, Table 3 shows that the measures of relevance denoted by the EMOTIONAL FACTOR priority are:
 (1) for exemplary message (1) based on "delay" contextually related to "train: +2;
 (2) for exemplary message (2) based on "<sad>": +5;
 (3) for exemplary message (3) based on "domestic" in relationship with "home": +7.

Step 158 performs anaphoric reference resolution in which anaphoric references identified by the syntactic analysis steps 145 are expanded by keeping a record (in database 159) of the semantic content analyses of any outgoing message sent by the user (i.e., by the mobile phone of the user) to the sender's phone number. The message content is stored with its EMOTIONAL FACTOR priority derived from step 156. For the last message to the sender's phone number, any emotional content on the outgoing message which could relate to the anaphoric reference identified for the incoming message results in an anaphoric reference priority component due to the anaphoric reference for the incoming message. Thus, for the second sentence in the exemplary message (2), an anaphoric reference priority component of +3 is included in the EMOTIONAL FACTOR in light of the user's last message to the sender of the incoming message pertaining to the anaphoric reference "That". In one embodiment, all such EMOTIONAL FACTORs due to an anaphoric reference are equal to a preset constant (e.g., +3 in the preceding example).

Thus the message priority has components of FEATURE FACTOR priority and EMOTIONAL FACTOR priority as illustrated in Table 4 for exemplary messages (1)-(3). Table 4 also lists the total priority (i.e., cumulative priority) for each message.

TABLE 4

| Message Priority Components | | | |
|---|---|---|---|
|  | Message 1 | Message 2 | Message 3 |
| FEATURE FACTOR Priority | +1 | +1 | +6 |
| EMOTIONAL FACTOR Priority | +2 | +5 + 3 | +7 |
| Total Priority | +3 | +9 | +13 |

The total priority for each message is then compared to a predetermined threshold (e.g., user-specified threshold). The threshold could be set to a default value by the service provider based on experience or some heuristic such as average user setting across all users. Alternatively, the threshold may be set by similar means in the handset itself, allowing a combination of user interaction (i.e., modifying the default value) and values determined by the service provider. If the calculated total priority exceeds the threshold, then the default handset behavior is overridden and the user is alerted (e.g., by an audio tone or vibration) in step 180 of FIG. 1. Otherwise, the handset's default behavior continues in step 130 of FIG. 1.

For illustrative purposes, it is assumed that the threshold is +12 in the example of Table 4, wherein: the priority for message 1 is +3 which does not exceed the threshold of +12; the priority for message 2 is +9 which does not exceed the threshold of +12; and the priority for message 3 is +13 which exceeds the threshold of +12. Therefore, message 3 is the only message of messages (1)-(3) that would be regarded as significant in the preceding example with respect to step 170 of FIG. 1.

In summary, the use of structural analysis determines how much the way in which the text message is written deviates from an unmarked sentence, which suggests increased importance or significance. In addition, the analysis of semantic context and intent, which when added to the priority derived from any structural features, provides an overall score to be used to tag an incoming message with a quantifiable significance level. This can then be compared with a user-specified threshold, or some generic default setting by the service provider or in the handset, to decide whether an alert should be issued to the handset user that the message is important.

Figure 5:
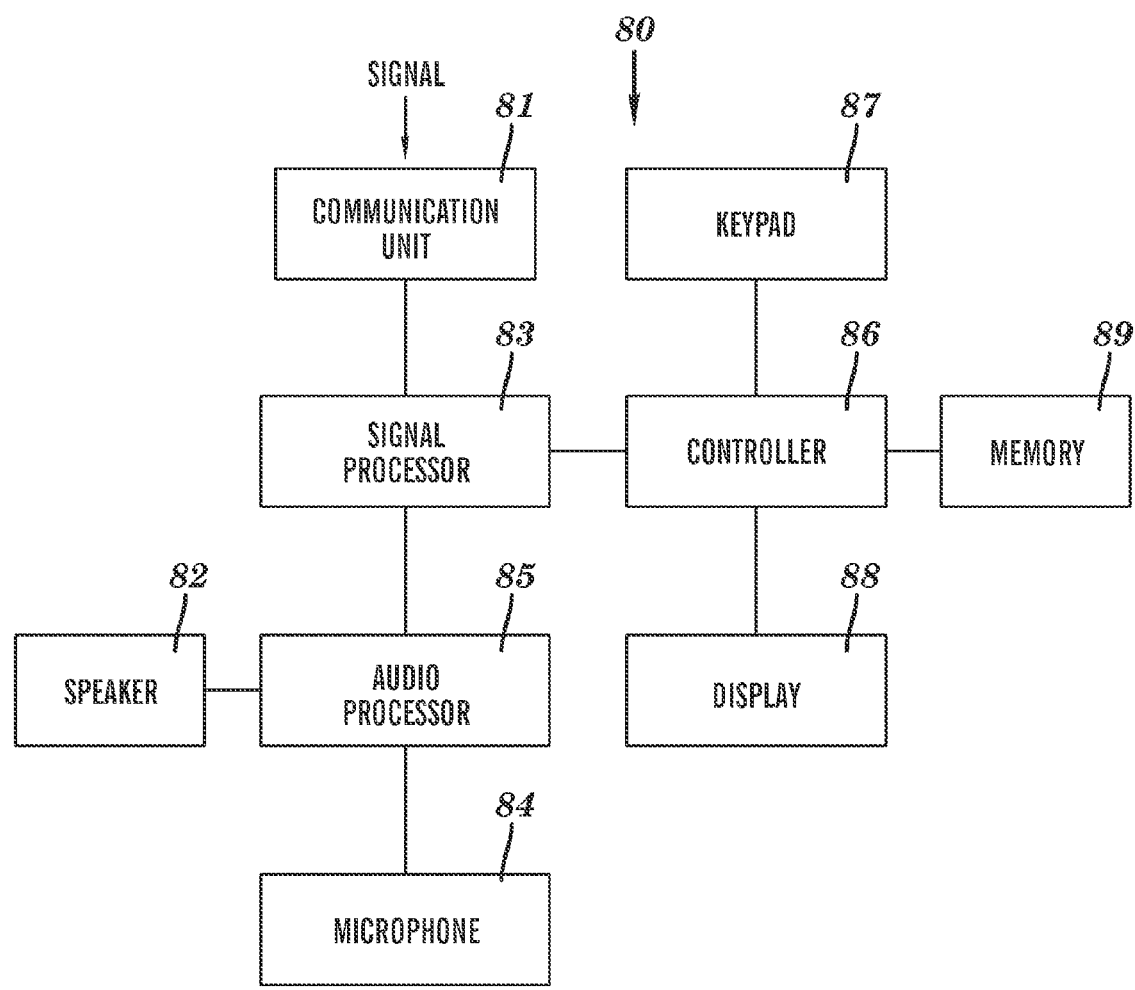
FIG. 5 depicts a system within a mobile telephone, in accordance with embodiments of the present invention.

FIG. 5 depicts a system 80 within a mobile phone, in accordance with embodiments of the present invention. The system 80 comprises a communication unit 81, a speaker 82, a signal processor, 83, a microphone 84, an audio processor 85, a controller 86, a keypad 87, a display 88, and a memory 89.

The communication unit 81 includes a radio frequency (RF) transmitter for increasing and amplifying the frequency of transmitted signals, and an RF receiver for performing low-noise amplification and for decreasing the frequency of received signals. The signal processor 83 includes a transmitter for encoding and modulating the transmitted signals and a receiver for decoding and demodulating the received signals through use of a modem and a CODEC (i.e., a device or program capable of performing encoding and decoding on a digital data stream or signal).

The audio processor 85 outputs via a speaker 82 audio signals that are output from the signal processor 83, and transfers audio signals that are generated by a microphone 84 to the signal processor 83. A keypad 87 includes function keys and other keys for inputting numbers and characters, and for setting up various functions. The keypad 87 may include keys for shifting positions, message selection, and transmission.

A memory 89, which comprises one or more discrete memory arrays and/or devices distributed within the mobile phone, includes a program memory and a data memory. Program code (i.e., software) is stored in the program memory of the memory 89 for controlling general operations of the mobile phone and for performing the method(s) of the present invention. Input data to the program code and data generated by execution of the program code (including temporary data and output data) are stored in the data memory of the memory 89.

A controller 86 controls overall operations of the mobile telephone and includes a processor for executing instructions included within the program code stored in the memory 89. The display 88, under the control of the controller 86, displays messages generated in the course of executing the program code stored in the memory 89.

The user enters input via the keypad 87. The audio processor 85 implements the generation of ring signals, tones, vibrations, etc.

While particular embodiments of the present invention have been described herein for purposes of illustration, many modifications and changes will become apparent to those skilled in the art. Accordingly, the appended claims are intended to encompass all such modifications and changes as fall within the true spirit and scope of the invention.

What is claimed is:

1. A method for processing a free format short message service (SMS) text message for alerting a user of a mobile phone to significant information in the free format SMS text message being received by the mobile phone, said method performed by executing program code on a processor in the mobile phone, said program code being stored in memory on the mobile phone, said method comprising:

receiving, by the mobile phone from a sender, the free format SMS text message;

after said receiving the free format SMS text message, normalizing the received message by replacing special character strings in the received message by corresponding phonetically equivalent character strings to generate a normalized message, wherein said normalizing comprises performing a lookup and substitution process in which a direct substitution is made of the special character strings in the received message by rewrite strings stored in a lexicon or said normalizing comprises rewriting the special character strings in the received message according to pronunciation rules;

after said normalizing the received message, determining a theme, a rheme, at least one structural component, and a sentence type of the normalized message, wherein the at least one structural component consists of a sentence subject, a verb complement, a time reference, and an anaphoric reference, wherein the sentence type indicates whether the normalized message is a declarative statement, a question requiring an answer of yes or no, a question whose first word begins with Wh, or a command, wherein said determining at least one structural component is performed after said determining the theme and the rheme, and wherein said determining the sentence type of the normalized message is performed after said determining at least one structural component;

after said determining the theme and the rheme, determining a plurality of features of the normalized message with respect to the determined theme, rheme, at least one structural component, and sentence type, wherein said determining the plurality of features comprises providing a list of features and selecting the plurality of features from the list of features, wherein the list of features consists of a feature of the theme and the sentence subject coinciding, a feature of the theme and the sentence subject not coinciding, a feature of a question whose first word begins with Wh and is followed by a verb, a feature of a question whose first word begins with Which and is followed by a noun, and a feature of said command;

after said determining the plurality of features, determining an individual feature priority associated with each feature of the plurality of features;

after said determining an individual feature priority associated with each feature of the plurality of features, determining a FEATURE FACTOR priority as a highest individual feature priority across all features of the plurality of features;

after said determining the sentence type of the normalized message, determining semantic content of the normalized message, wherein said determining semantic content of the normalized message comprises deriving first keywords from the normalized message followed by performing a contextual search to associate the first keywords with second keywords that differ from the first keywords, wherein the first keywords include a noun, a verb, and an adjective;

after said determining semantic content of the normalized message, determining an EMOTIONAL FACTOR priority for the normalized message, based on the determined semantic content;

after said determining an EMOTIONAL FACTOR priority for the normalized message, ascertaining that a prior message comprising emotional content is associated with the anaphoric reference and that the prior message had been sent by a user of the mobile phone to the sender, wherein said determining the EMOTIONAL FACTOR priority comprises, in response to said ascertaining, including in the EMOTIONAL FACTOR priority an anaphoric reference priority component associated with the anaphoric reference;

after said determining the FEATURE FACTOR priority and said determining the EMOTIONAL FACTOR priority, computing a total priority as a sum of the determined FEATURE FACTOR priority and the determined EMOTIONAL FACTOR priority;

after said computing the total priority, determining that the received message is significant by determining that computed total priority exceeds a predetermined threshold; and responsive to said determining that the received message is significant, alerting the user by an audio tone or vibration that the received message is significant.

* * * * *